United States Patent [19]

Cobern et al.

[11] Patent Number: 5,034,929

[45] Date of Patent: Jul. 23, 1991

[54] MEANS FOR VARYING MWD TOOL OPERATING MODES FROM THE SURFACE

[75] Inventors: Martin E. Cobern, Cheshire; Walter A. Helm, Plainville, both of Conn.

[73] Assignee: Teleco Oilfield Services Inc., Meriden, Conn.

[21] Appl. No.: 389,321

[22] Filed: Aug. 2, 1989

[51] Int. Cl.[5] .............................................. G01V 1/40

[52] U.S. Cl. ...................................... 367/83; 340/853; 340/861; 175/24; 73/151

[58] Field of Search ............................ 367/83, 84, 85; 340/861, 853; 175/24, 25, 26, 27, 38; 73/151, 152

[56] References Cited

U.S. PATENT DOCUMENTS

| | | | |
|---|---|---|---|
| 3,800,277 | 3/1974 | Patton et al. | 367/83 |
| 3,863,203 | 1/1975 | Patton et al. | 367/83 |
| 3,893,525 | 7/1975 | Dower et al. | 175/24 |
| 3,967,680 | 7/1976 | Jeter | 340/853 |
| 4,763,258 | 8/1988 | Engelder | 340/853 |

*Primary Examiner*—Ian J. Lobo

*Attorney, Agent, or Firm*—Fishman, Dionne & Cantor

[57] ABSTRACT

A method and apparatus for establishing a remote communications link from the rig floor to the downhole MWD system is presented. In accordance with the present invention, the state of a physical condition downhole is changed in a predetermined timed sequence. This state change is controlled on the surface at the drilling platform and detected downhole by the MWD system. The desired operating mode of the MWD system is then determined based on the detected time sequence of the state changes. Preferred embodiments of the present invention utilize two different state changes which are detectable downhole and which can be controlled at the surface. In a first embodiment, the state changes comprise a preselected timed sequence of powering the MWD system up or down. This power cycling is accomplished by operating the mud pump in an ON/OFF sequence which will cause the MWD turbine to similarly be powered up or down. In a second embodiment of the present invention, the state changes are accomplished by modulating the mud flow in a timed sequence which will result in modulations to the MWD turbine. Preselected modulations in the turbine will result in a pattern of power modulations in the MWD systems which will trigger a different operating mode.

12 Claims, 5 Drawing Sheets

TRANSITION CONDITIONS

A → T OFF ≥ T OFF (MAX)

B → T OFF < T OFF (MAX)

C → T ON > T ON (MAX)

MEANS FOR VARYING MWD TOOL OPERATING MODES FROM THE SURFACE

BACKGROUND OF THE INVENTION

This invention relates to the field of borehole measurement while drilling (MWD). More particularly, this invention relates to the communication of control information from the drilling rig floor to the MWD instrumentation system when it is situated downhole near the bottom of the drill string.

An MWD system may consist of a number of sensors connected to a computer based data acquisition system. The computer collects the information from the sensors and digitizes and formats this information for downhole storage and for binary data transmission to the surface. Relevant parameters of the data collection and formatting process are stored according to preprogrammed instructions residing in the computer's memory.

Current state of the art of MWD data transmission is via mud pulse telemetry. Data communication rates achievable with this technology is on the order of one bit per second. As the number of sensors developed for downhole application increases, the time required to transmit all the data increases. Further, information update requirements of certain parameters may vary depending on conditions arising during the course of drilling. Unfortunately, there is not now an efficient and reliable method of relaying control information from the drill rig at the surface downhole to the MWD system so as to effect a change in operation of the system (e.g. an operational mode change). Presently, the MWD system must be raised to the surface where operational changes are input to the computer. Thus, it would be advantageous to be able to alter the operating modes of the MWD system without removing it from the borehole. Affecting a change without removal would save a substantial amount of time in the drilling process and therefore afford considerable cost savings.

SUMMARY OF THE INVENTION

The above-discusses and other problems and deficiencies of the prior art are overcome or alleviated by the method and apparatus of the present invention for establishing a remote communications link from the rig floor (e.g. well platform) to the downhole MWD system. In accordance with the present invention, the state of a physical condition downhole is changed in a predetermined timed sequence. This state change is controlled on the surface at the drilling platform and simultaneously detected or measured downhole by the MWD system. The desired operating mode of the MWD system is then determined based on the detected time sequence of the state changes.

Preferred embodiments of the present invention utilize two different state changes which are detectable downhole and which can be controlled at the surface. In a first embodiment, the state changes comprise a preselected timed sequence of powering the MWD system up or down. This power cycling is accomplished by operating the mud pump in an ON/OFF sequence which will cause the MWD turbine to similarly be powered up or down.

In a second embodiment of the present invention, the state changes are accomplished by modulating the mud flow in a timed sequence which will result in modulations to the MWD turbine. Preselected modulations in the turbine will result in a pattern of power modulations in the MWD systems which will trigger a different operating mode.

The above-discussed and other features and advantages of the present invention will be appreciated and understood by those of ordinary skill in the art from the following detailed description ad drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
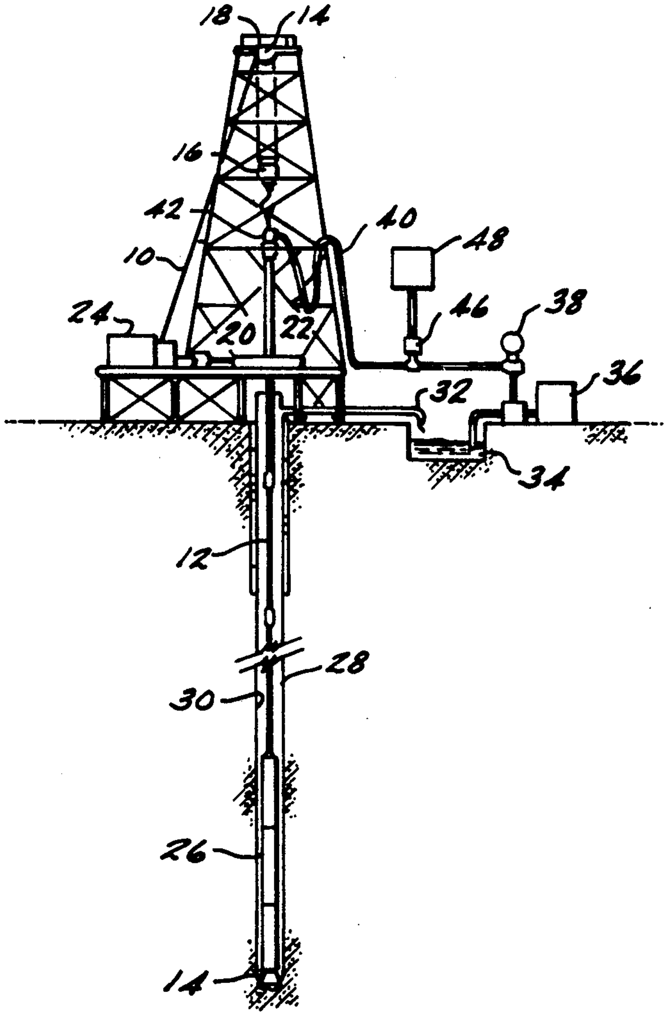
FIG. 1 is a generalized schematic view of a borehole and drilling derrick showing the environment for the present invention.
Figure 2:
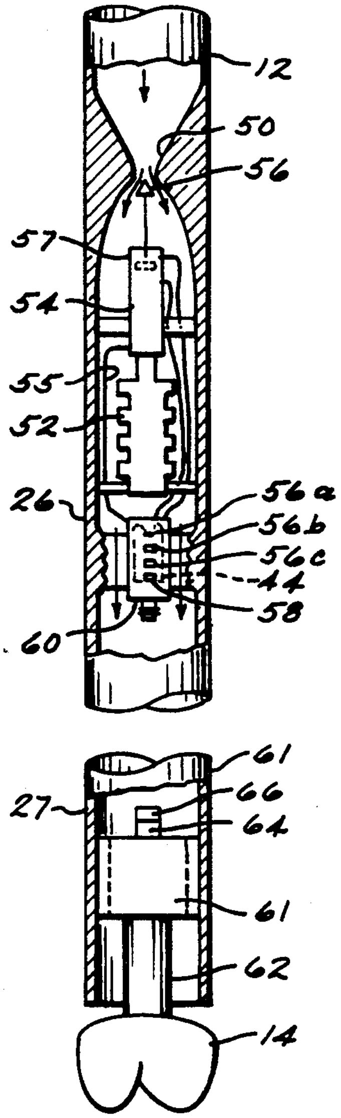
FIG. 2 is a front elevation view, partly in cross section, of a borehole measurement-while-drilling (MWD) system.

Referring first to FIGS. 1 and 2, the general environment is shown in which the present invention is employed. It will, however, be understood that these generalized shownings are only for purposes of showing a representative environment in which the present invention may be used, and there is no intention to limit applicability of the present invention to the specific configuration of FIGS. 1 and 2.

The drilling apparatus shown in FIG. 1 has a derrick 10 which supports a drill string or drill stem 12 which terminates in a drill bit 14. As is well known in the art, the entire drill string may rotate, or the drill string may be maintained stationary and only the drill bit is rotated. The drill string 12 is made up of a series of interconnected segments, with new segments being added as the depth of the well increases. In systems where the drill bit turbine driven, it is often desirable to slowly rotate the drill string. That can be accomplished by reactive torque from the drilling, or by actual rotation of the drill string from the surface. To that latter end, the drill string is suspended from a movable block 16 of a winch 18, and the entire drill string may be driven in rotation by a square kelly 20 which slidably passes through but is rotatably driven by the rotary table 22 at the foot of the derrick. A motor assembly 24 is connected to both operate winch 18 and rotatably drive rotary table 22.

The lower part of the drill string may contain one or more segments 26 of larger diameter than other segments of the drill string known as drill collars. As is well known in the art, these drill collars may contain sensors and electronic circuitry for sensors, and power sources, such as mud driven turbines which drive drill bits and/or generators and, to supply the electrical energy for the sensing elements.

Drill cuttings produced by the operation of drill bit 14 are carried away by a large mud stream rising up through the free annular space 28 between the drill string and the wall 30 of the well. That mud is delivered via a pipe 32 to a filtering and decanting system, schematically shown as tank 34. The filtered mud is then sucked by a pump 36, provided with a pulsation absorber 38, and is delivered via line 40 under pressure to a revolving injector head 42 and then to the interior of drill string 12 to be delivered to drill bit 14 and the mud turbine if a mud turbine is included in the system.

The mud column in drill string 12 also serves as the transmission medium for carrying signals of downhole parameters to the surface. This signal transmission is accomplished by the well known technique of mud pulse generation whereby pressure pulses are generated in the mud column in drill string 12 representative of sensed parameters down the well. The drilling parameters are sensed in a sensor unit 44 (see FIG. 2) in a drill collar 26 near or adjacent to the drill bit. Pressure pulses are established in the mud stream within drill string 12, and these pressure pulses are received by a pressure transducer 46 and then transmitted to a signal receiving unit 48 which may record, display and/or perform computations on the signals to provide information of various conditions down the well.

Referring briefly to FIG. 2, a schematic system is shown of a drill string segment 26 in which the mud pulses are generated. The mud flows through a variable flow orifice 50 and is delivered to drive a first turbine 52. The first turbine powers a generator 54 which delivers electrical power to the sensors in sensor unit 44 (via electrical lines 55). The output from sensor unit 44, which may be in the form of electrical, hydraulic or similar signals, operates a plunger 56 having a valve driver 57 which may be hydraulically or electrically operated. Variations in the size of orifice 50 create pressure pulses in the mud stream which are transmitted to and sensed at the surface to provide indications of various conditions sensed by sensor unit 44. This mud pulse transmitter is more fully shown and described in U.S. Pat. Nos. 3,982,431, 4,013,945 and 4,021,774 assigned to the assignee hereof. Mud flow is indicated by the arrows.

Since sensors in sensor unit 44 are magnetically sensitive, the particular drill string segment 26 which houses the sensor elements must be a non-magnetic section of the drill string, preferably of stainless steel or monel. Sensor unit 44 is further encased within a non-magnetic pressure vessel 60 to protect and isolate the sensor unit from the pressure in the well.

While sensor unit 44 may contain other sensors for directional or other measurement, it will contain a triaxial magnetometer with three windings, those windings being shown separately, merely for purposes of illustration and description, as windings 56A, 56B, and 56C, being respectively the "x", "y" and "z" magnetometer windings.

Turning now to FIGS. 3-7, a first embodiment of the present invention will now be discussed. As mentioned, the present invention utilizes a predetermined timed sequence of state changes of a physical condition downhole to communicate or transmit information from the well platform downhole. The changes in the physical condition are controlled at the surface preferably to effect a change in operation of the MWD system (usually a MWD system software change). A important feature of the first embodiment is that of measuring the time between successive power up cycles of the MWD system. When the criteria of not exceeding maximum power down time is met for some minimum number of repetitions, the MWD system software changes the operating mode of the MWD system and resets the cycle counter. In accordance with the present invention, such power up cycling can be accomplished by successively starting and stopping mud flow from the pump 36 through the interior of the drill string 12 and hence through MWD turbine 52.

Preferably, the method of the first embodiment incorporates protection from inadvertant operating system mode changes by requiring successive events. Failure to meet the maximum "time on" or "time off" criteria the requisite number of times immediately resets the cycle counter without changing the system's operating mode.

Figure 3:
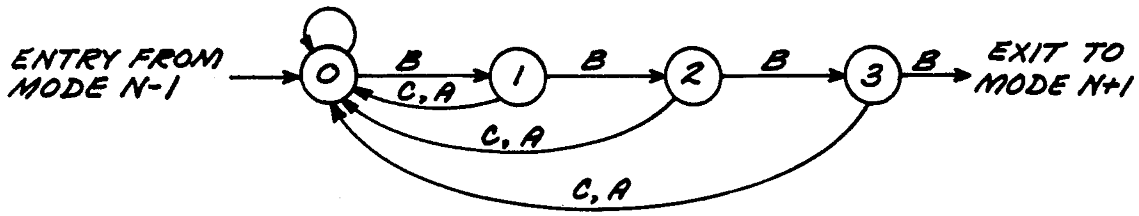
FIG. 3 is a state diagram for transitions in an operating mode for of the present invention.

An example of a sequence to change the operating mode can be depicted in a state diagram as shown in FIG. 3. Each state is an increment in the cycle counter. Each circle represents a possible path between operating states. The arrows indicate the direction in which the transitions from one state to another can occur. The letters associated with each line indicate the condition which forces the transition. The diagram further shows the sequential conditions that must be met to select any mode. The number of cycles required to change modes in this diagram could be increased or decreased to trade off the likelihood of inadvertent mode change with the time required to force such a change. Thus, in FIG. 3, a sequence of four (4) ON/OFF cycles corresponding to the timing of B is needed to move through the states identified at "0", "1", "2" and "3" and thereby change the MWD system from operating mode N−1 to operating mode N+1. If at any time during that ON/OFF sequence, either of the timing transitions of A or C occur, then the cycle counter is reset to the "0" state.

Figure 4:
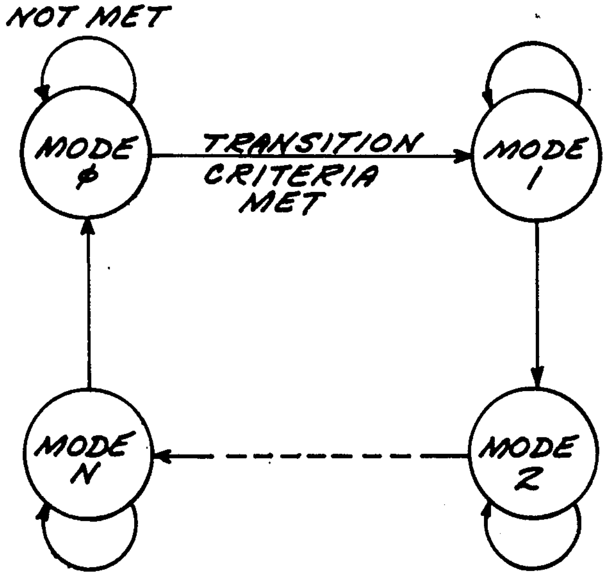
FIG. 4 is a state diagram for transitions between operating modes for of the present invention.
Figure 7:
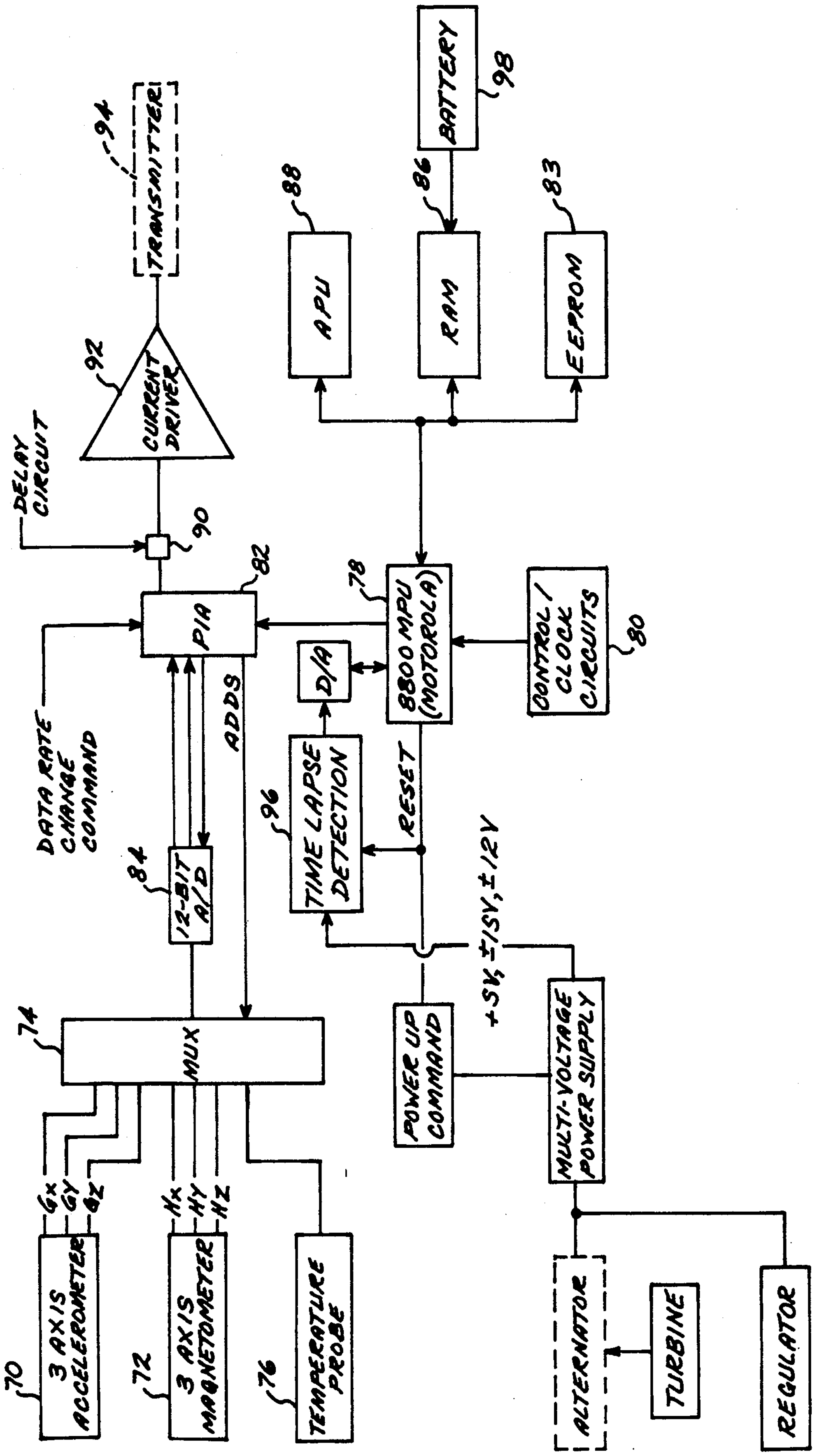
FIG. 7 is a block diagram of an MWD system in accordance with the present invention.

The cycle count is updated and stored in non volatile read/write memory such as EEPROM (see item 83 in FIG. 7). The transitions between system modes is shown in FIG. 4. The transitions occur in circular fashion. Any number of modes is possible. The trade off is that the greater the number of modes, the longer the potential time required to switch between two non adjacent modes. It will be appreciated that for each mode transition, e.g. mode 1 to mode 2, the timed sequence transition criteria of FIG. 3 must be complied with or no mode change will take place.

The first embodiment of this invention consists of three elements added to a conventional MWD system to form a complete MWD system having reprogramming capability (as shown in FIG. 7). These elements are:

1. A means of establishing the time lapse between MWD system power down and subsequent power up (FIG. 5).
2. Software to implement the state machines shown in FIGS. 3 and 4.
3. Some form of non volatile memory to retain the state machine states while the system is unpowered (due to the absense of mud flow).

Figure 5:
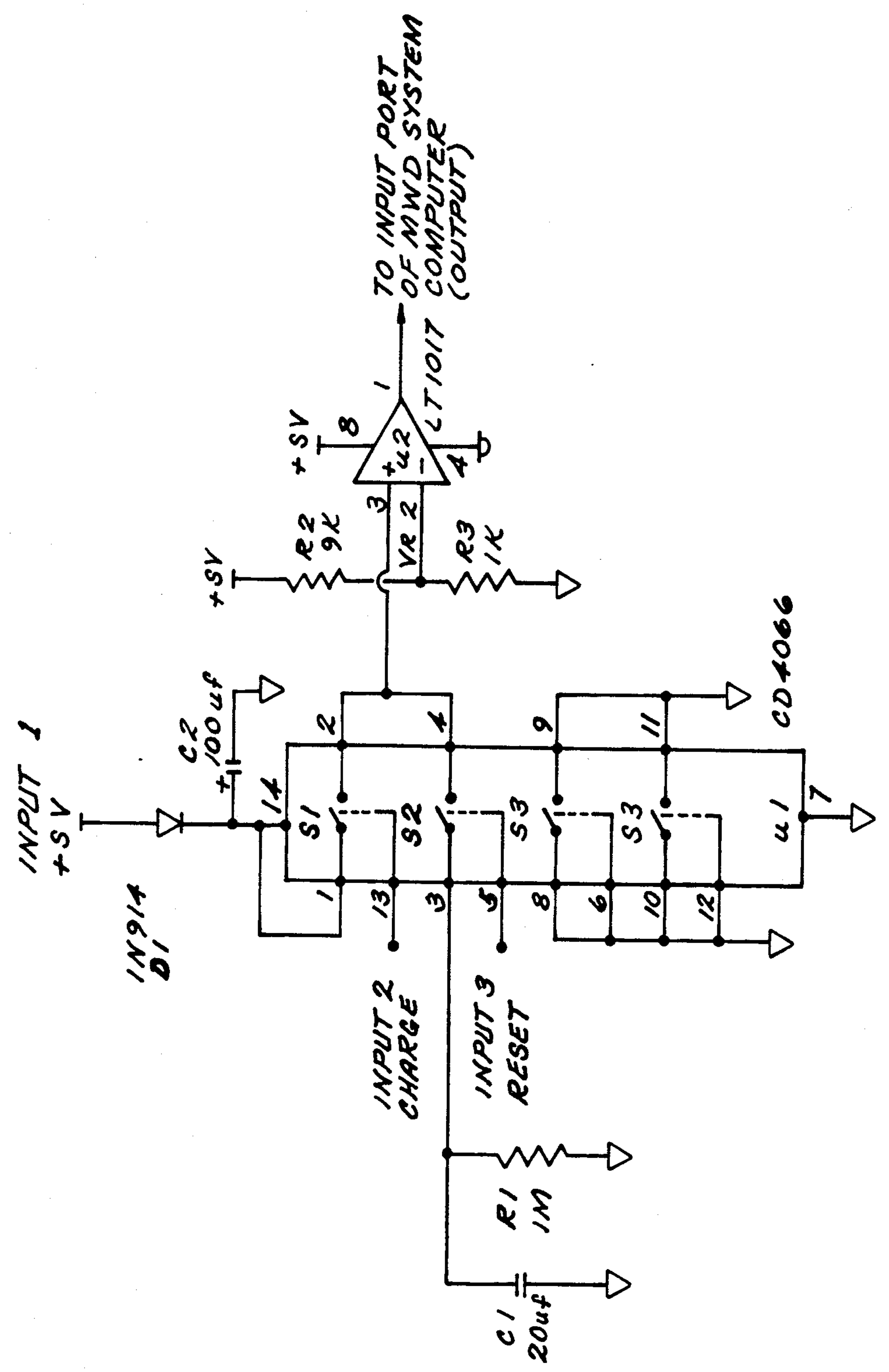
FIG. 5 is a circuit diagram of a time lapse detection circuit used in the present invention.

One means of detecting time lapse is shown in FIG. 5. The circuit shown receives three inputs from the MWD system and provides one output back to the MWD system. The inputs consist of +5 volt power, the "charge" control signal, and the RESET signal The +5 volt power buss is activated by mud flow driving the MWD system turbine. This power buss is used to power various MWD system elements including its computer. Since this Power buss is already present in the system, it is used in this circuit as a power source for circuit elements U1 and U2, a source to charge energy storage capacitor C2, a source to generate the reference voltage Vr via the resistor divider network formed by resistors R2 and R3, and a source to charge timing capacitor C1 when switches S1 and S2 are closed.

The RESET signal is used to initialize the MWD system during power up and Prevent erratic behavior during power down. This signal is asserted (logic zero) and maintained whenever +5 volt is out of tolerance (below the minimum level required to guarantee proper function of the computer system). This signal is used advantageously by the circuit of FIG. 5 to disconnect the subcircuit composed of the parallel combination of R1 and C1 from the rest of the circuit when mud flow is interrupted. When 5 volts is within tolerance, reset will go to a logic one, closing S2. The voltage of capacitor C1 (Vc1) can now be compared against reference voltage Vr by comparator U2.

The output of the comparator is detected by the computer as a logic one or a logic zero. A logic one implies that Vc is greater than Vr, which in turn implies that Toff is less than Toff (max) as shown in the state diagram of FIG. 3.

Having detected whether Toff is less than Toff (max) is true or false, the computer can assert the "charge" signal. This closes S1 and allows C1 to be recharged for the next part of the reprogramming sequence. Note S2 was already closed by RESET.

Capacitor C1 will charge to about 4.5 volts and stay there as long as +5 volt power is applied. Diode D1 accounts for the approximately 0.5 volt drop from 5 volts. Capacitor C2 is charged to 4.5 volts through Diode D1 immediately as +5 volts is asserted.

C2 is sized so that during power down its voltage will decay more slowly than that on C1. With U1 thus powered, the C1 R1 network is kept isolated during power down.

Vr is established by R2 and R3 to be 0.5 volts. From this, the values of R1 and C1, and the initial voltage of C1, the value of Toff (max) can be established as:

$$\text{Toff (max)} = R1\ C1\ \ln(4.5\ V)/(0.5\ V) = 44 \text{ seconds}$$

It is understood that Toff (max) could be adjusted by varying any of the influencing parameters.

Figure 6:
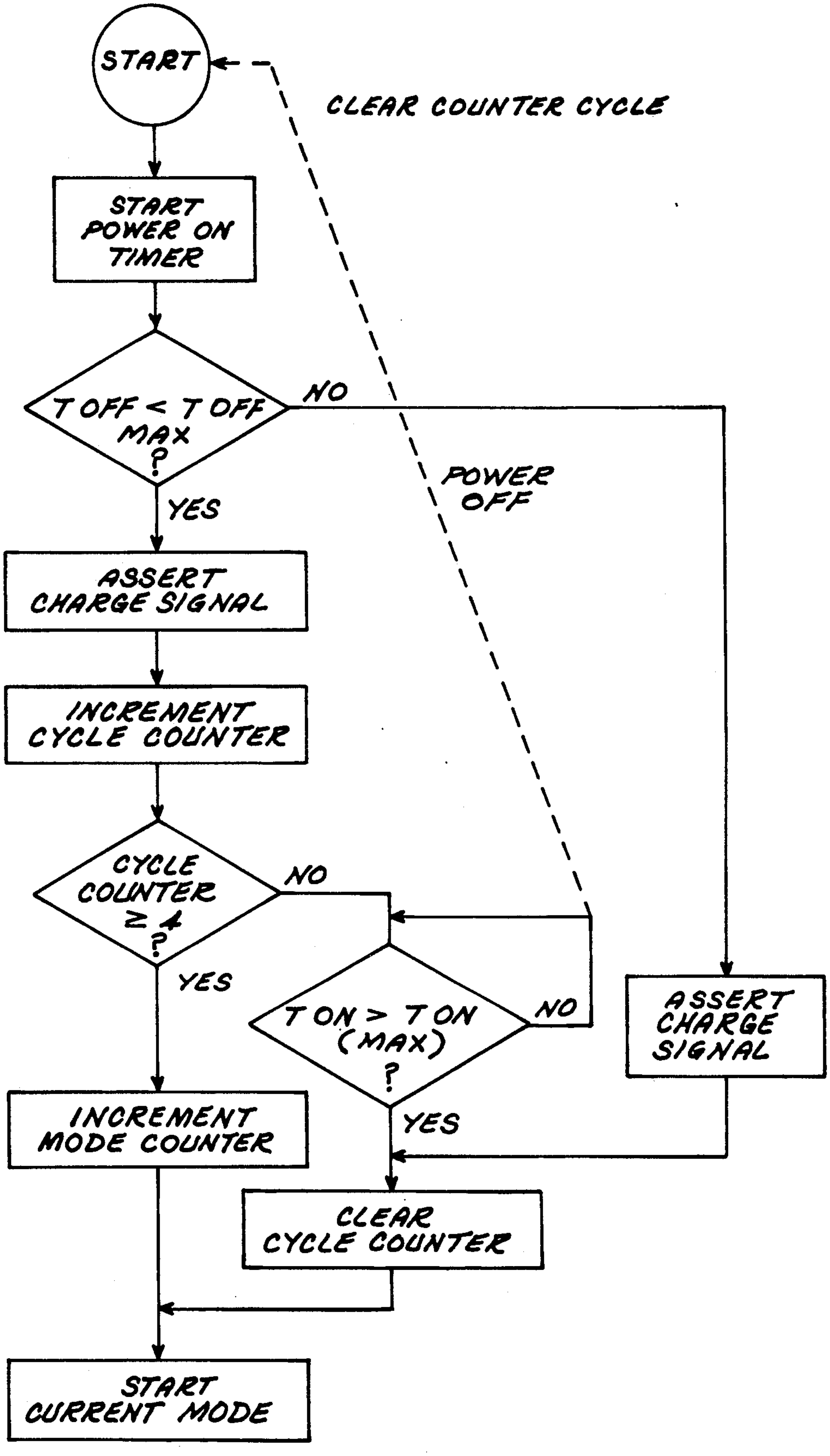
FIG. 6 is a flowchart for of the present invention.

A flowchart of the software necessary to implement the state machines of FIGS. 3 and 4 is shown in FIG. 6.

The "start power on timer" block implies the existence of a real time clock in the MWD computer system. Its implementation is well understood by anyone familiar with the state of the art. The clock is needed to establish if the "C" transition of FIG. 3 must be carried out.

Executing of the "Toff is less than Toff (max)" decision block requires reading the input port to which the output of U2 of FIG. 5 is connected. A logic one forces the "yes" branch and vice versa.

The "increment cycle counter" block requires reading a non volatile memory location containing the current count, adding one, and writing the new count back into the same location. Implementing non volatile read/write memory using EEPROM memory technology or battery backed RAM is well understood and is shown in FIG. 7 at items 83 and 98, respectively, which will now be discussed.

The method of the present invention is intended to be implemented in conjunction with the normal commercial operation of a known MWD system and apparatus of Teleco Oilfield Services Inc. (the assignee hereof) which has been in commercial operation for several years. The known system is offered by Teleco as its CDS (Computerized Directional System) for MWD measurement; and the system includes, inter alia, a triaxial magnetometer, a triaxial accelerometer, control, sensing and processing electronics, and mud pulse telemetry apparatus, all of which are located downhole in a rotatable drill collar segment of the drill string. The known apparatus is capable of sensing the components Gx, Gy, and Gz of the total gravity field Go; the components Hx, Hy, and Hz of the total magnetic field Ho; and determining the tool face angle and dip angle (the angle between the horizontal and the direction of the magnetic field).

Referring to FIG. 7, a block diagram of the known CDS system of Teleco is shown. This CDS system is located downhole in the drill string in a drill collar near the drill bit. This CDS system includes a 3-axis accelerometer 70 and a 3-axis magnetometer 72. The x axis of each of the accelerometer and the magnetometer is on the axis of the drill string. To briefly and generally describe the operation of this system, accelerometer 70 senses the Gx, Gy, and Gz components of the downhole gravity field Go and delivers analog signals commensurate therewith to a multiplexer 74. Similarly, magnetometer 72 senses the Hx, Hy, and Hz components of the downhole magnetic field. A temperature sensor 76 senses the downhole temperature compensating signal to multiplexer 74. The system also has a programmed microprocessor unit 78, system clocks 80 and a peripheral interface adapter 82. All control, calculation programs and sensor calibration data are stored in EEPROM Memory 83.

Under the control of microprocessor 78, the analog signals to multiplexer 74 are multiplexed to the analog-to-digital converter 84. The output digital data words from A/D converter 84 are then routed via peripheral interface adapter 82 to microprocessor 78 where they are stored in a random access memory(RAM) 86 for the calculation operations. An arithmetic processing unit (APU) 88 provides off line high performance arithmetic and a variety of trigonometry operations to enhance the power and speed of data processing. The digital data for each of Gx, Gy, Gz, Hx, Hy, Hz are averaged in arithmetic processor unit 84 and the data are used to calculate azimuth and inclination angles in microprocessor 78. These angle data are then delivered via delay circuitry 90 to operate a current driver 92 which, in turn, operates a mud pulse transmitter such as was described above.

In accordance with the present invention and as discussed above, the time lapse detection circuit of FIG. 5 is shown at 96, and a battery for RAM 86 is shown at 98.

In a second embodiment of the present invention, the operating mode of the MWD system is changed by a timed sequence of changes in the amount of power generated by the MWD turbine. In other words, rather than the power being turned on and off as in the first embodiment, the second embodiment of this invention calls for modulating the amount of power sent to the MWD system in a timed sequence to move from one operating mode to another. This modulation is accomplished by modulating the mud flow from the mud pump at the drill rig surface through the MWD turbine. This second embodiment may be carried out using a method and apparatus similar to that described with regard to the first embodiment.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of communicating instructions from a drill platform on the surface downhole to a measurement while drilling (MWD) system in a borehole , the MWD system having a preselected amount of power input thereto, the borehole having preselected physical conditions associated therewith which result from the drilling operations, the preselected physical conditions being detectable by sensor means in the MWD system and wherein drilling mud flows through the borehole during drilling operations, including the steps of:

changing the state of a single physical condition downhole in a predetermined time sequence over a preselected time period, the sequence of state changes of said single downhole physical condition being controlled from the drill platform at the surface wherein the state change to the single physical condition comprises changes in the amount of mud flowing in the borehole beyond normal fluctuations and above or below a preselected threshold;

detecting downhole the state changes in mud flow, the predetermined timed sequence and the preselected time period wherein said changes in mud flow are detected by turbine means associated with the MWD system and wherein said changes in mud flow to the turbine means cause changes in power to the MWD system, said changes in power comprising ON/OFF powering to the MWD system by sequential starting and stopping of mud flow to the turbine means; and converting the detected timed sequence of state changes to instructions for the MWD system.

2. The method of claim 1 including time lapse detection circuit means in the MWD system for detecting the changes in power to the MWD system.

3. The method of claim 1 wherein:

the instructions comprise switching from a first downhole operating mode to a second downhole operating mode.

4. The method of claim 1 including:

repeating the timed sequence of state changes in a predetermined pattern to avoid inadvertant or erroneous communication of instructions.

5. An apparatus for communicating instructions from a drill platform on the surface downhole to a measurement while drilling (MWD) system in a borehole, the MWD system having a preselected amount of power input thereto, the borehole having a preselected physical conditions associated therewith which result from the drilling operations, the preselected physical conditions being detectable by sensor means in the MWD system and wherein drilling mud flows through the borehole during drilling operations, including:

means for changing the state of a single physical condition downhole in a predetermined timed sequence over a preselected time period, the sequence of state changes of said single downhole physical condition being controlled from the drill platform at the surface wherein the state change to the single physical condition comprises changes in the amount of mud flowing in the borehole beyond normal fluctuations and above or below a preselected threshold;

means downhole for detecting the state changes, the predetermined time sequence and the preselected time period wherein said changes in mud flow are detected by turbine means associated with the MWD system and wherein said changes in mud flow to the turbine means cause changes in power to the MWD system, said changes in power comprising means for ON/OFF powering to the MWD system by sequential starting and stopping of mud flow to the turbine means; and means for converting the detected timed sequence of state changes to instructions for the MWD system.

6. The apparatus of claim 5 including time lapse detection circuit means in the MWD system for detecting the changes in power to the MWD system.

7. The apparatus of claim 10 wherein the instructions comprise switching from a first downhole operating mode to a second downhole operating mode.

8. The apparatus of claim 5 including:

means for repeating the timed sequence of state changes in a predetermined pattern to avoid inadvertant or erroneous communication of instructions.

9. A method of communicating instructions from a drill platform on the surface downhole to a measurement while drilling (MWD) system in a borehole, the MWD system having a preselected amount of power input thereto, the borehole having preselected physical conditions associated therewith which result from the drilling operations, the preselected physical conditions being detectable by sensor means in the MWD system and wherein drilling mud flows through the borehole during drilling operations and including the steps of:

changing the state of a single physical condition downhole in a predetermined time sequence over a preselected time period, the sequence of state changes of said single downhole physical condition being controlled form the drill platform at the surface wherein the state change to the single physical condition comprises changes in the amount of mud flowing in the borehole beyond normal fluctuations and above or below a preselected threshold;

detecting downhole the state changes in mud flow, the predetermined timed sequence and the preselected time period wherein said changes in mud flow are detected by turbine means associated with the MWD system and wherein said changes in mud flow to the turbine means cause changes in power to the MWD system, said changes in power comprising modulating the level of power supplied to the MWD system by modulating the flow of mud to the turbine means; and converting the detected timed sequence of state changes to instructions for the MWD system.

10. A method of communicating instructions from a drill platform on the surface downhole to a measurement while drilling (MWD) system in a borehole, the MWD system having a preselected amount of power input thereto, the borehole having preselected physical conditions associated therewith which result from the drilling operations, the preselected physical conditions being detectable by sensor means in the MWD system and wherein drilling mud flows through the borehole during drilling operations and including the steps of:

changing the state of a single physical condition downhole in a predetermined time sequence over a preselected time period, the sequence of state changes of said single downhole physical condition being controlled from the drill platform at the surface wherein the state change to the single physical condition comprises changes in the amount of mud flowing in the borehole beyond normal fluctuations and above or below a preselected threshold;

detecting downhole the state changes in mud flow, the predetermined timed sequence and the preselected time period wherein said changes in mud flow are detected by turbine means associated with the MWD system and wherein said changes in mud flow to the turbine means cause changes in power to the MWD system, and including time lapse detection circuit means in the MWD system for detecting the changes in power to the MWD system; and converting the detected timed sequence of state changes to instructions for the MWD system.

11. An apparatus for communicating instructions from a drill platform on the surface downhole to a measurement while drilling (MWD) system in a borehole, the MWD system having a preselected amount of power input thereto, the borehole having preselected physical conditions associated therewith which result form the drilling operations, the preselected physical conditions being detectable by sensor means in the MWD system and wherein drilling mud flows through the borehole during drilling operations and including:

means for changing the state of a single physical condition downhole in a predetermined timed sequence over a preselected time period, the sequence of state changes of said single downhole physical condition being controlled from the drill platform at the surface wherein the state change to the single physical condition comprises changes in the amount of mud flowing in the borehole beyond normal fluctuations and above or below a preselected threshold;

means downhole for detecting the state changes, the predetermined time sequence and the preselected time period wherein said changes in mud flow are detected by turbine means associated with the MWD system and wherein said changes in mud flow to the turbine means cause changes in power to the MWD system, said changes in power comprising means for modulating the level of power supplied to the MWD system by modulating the flow of mud to the turbine means; and means for converting the detected timed sequence of state changes to instructions for the MWD system.

12. An apparatus for communicating instructions from a drill platform on the surface downhole to a measurement while drilling (MWD) system in a borehole, the MWD system having a preselected amount of power input thereto, the borehole having preselected physical conditions associated therewith which result form the drilling operations, the preselected physical conditions being detectable by sensor means in the MWD system and wherein drilling mud flows through the borehole during drilling operations and including:

means for changing the state of a single physical condition downhole in a predetermined timed sequence over a preselected time period, the sequence of state changes of said single downhole physical condition being controlled from the drill platform at the surface wherein the state change to the single physical condition comprises changes in the amount of mud flowing in the borehole beyond normal fluctuations and above or below a preselected threshold;

means downhole for detecting the state changes, the predetermined time sequence and the preselected time period wherein said changes in mud flow are detected by turbine means associated with the MWD system and wherein said changes in mud flow to the turbine means cause changes in power to the MWD system, and including time lapse detection circuit means in the MWD system for detecting the changes in power to the MWD system; and means for converting the detected timed sequence of state changes to instructions for the MWD system.

* * * * *

UNITED STATES PATENT AND TRADEMARK OFFICE
CERTIFICATE OF CORRECTION

PATENT NO. : 5,034,929
DATED : July 23, 1991
INVENTOR(S) : Martin E. Cobern and Walter A. Helm

It is certified that error appears in the above-identified patent and that said Letters Patent is hereby corrected as shown below:

| | |
|---|---|
| Col. 1, line 42 | Delete "discusses" and insert therefore -- discussed --. |
| Col. 2, line 6 | Delete "ad" and insert therefore -- and --. |
| Col. 2, line 18 | Delete "of". |
| Col. 2, line 20 | Delete "of". |
| Col. 2, line 23 | Delete "of". |
| Col. 2, line 33 | Delete "shownings" and insert therefore -- drawings --. |
| Col. 2, line 46 | Insert -- is -- between "bit" and "turbine". |
| Col. 3, line 62 | Delete "A" and insert therefore -- An --. |
| Col. 4, line 60 | Insert -- . -- after "signal" and before "The". |
| Col. 4, line 64 | Delete "Power" and insert therefore -- power--. |
| Col. 5, line 4 | Delete "Prevent" and insert therefore -- prevent --. |

UNITED STATES PATENT AND TRADEMARK OFFICE

CERTIFICATE OF CORRECTION

PATENT NO. : 5,034,929

DATED : July 23, 1991

INVENTOR(S) : Martin E. Cobern and Walter A. Helm

It is certified that error appears in the above-identified patent and that said Letters Patent is hereby corrected as shown below:

Col. 7, line 53 Delete "a" after the word "having".

Col. 8, line 16 Change "claim 10" to --claim 5 --.

Signed and Sealed this

Fifteenth Day of June, 1993

*Attest:*

Michael K. Kirk

MICHAEL K. KIRK

*Attesting Officer*

*Acting Commissioner of Patents and Trademarks*